(12) United States Patent
Waite et al.

(10) Patent No.: US 12,210,229 B2
(45) Date of Patent: *Jan. 28, 2025

(54) ACCOMMODATING SOFT CONTACT LENS

(71) Applicant: OneFocus Technology, LLC, Fernandina Beach, FL (US)

(72) Inventors: Steven B. Waite, Fernandina Beach, FL (US); Amitava Gupta, Fernandina Beach, FL (US); Urban Schnell, Liebefeld-Bern (CH)

(73) Assignee: OneFocus Technology, LLC, Fernandina Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/511,015

(22) Filed: Nov. 16, 2023

(65) Prior Publication Data

US 2024/0219752 A1    Jul. 4, 2024

Related U.S. Application Data

(63) Continuation of application No. 16/932,228, filed on Jul. 17, 2020, now Pat. No. 11,874,531, which is a
(Continued)

(51) Int. Cl.
| | | |
|---|---|---|
| *G02C 7/08* | (2006.01) | |
| *G02C 7/04* | (2006.01) | |
| *G02C 7/02* | (2006.01) | |

(52) U.S. Cl.
CPC .............. *G02C 7/085* (2013.01); *G02C 7/04* (2013.01); *G02C 7/045* (2013.01); *G02C 7/021* (2013.01); *G02C 7/048* (2013.01); *G02C 2202/18* (2013.01)

(58) Field of Classification Search
CPC ........ G02C 7/049; G02C 7/048; G02C 7/047; G02C 7/046; G02C 7/045; G02C 7/085; G02C 7/04
See application file for complete search history.

(56) References Cited

U.S. PATENT DOCUMENTS 3,246,941 A    4/1966 Moss
3,594,074 A    7/1971 Rosen
(Continued)

FOREIGN PATENT DOCUMENTS

CN    101277659 A    10/2008
CN    101351169 A    1/2009
(Continued)

OTHER PUBLICATIONS

Gulsen, et al., Ophthalmic Drug Delivery through Contact Lenses. Investigative Ophthalmology & Visual Science, Jul. 2004. 45:7; 2342-2347.
(Continued)

*Primary Examiner* — Christopher Stanford
*Assistant Examiner* — Journey F Sumlar
(74) *Attorney, Agent, or Firm* — FisherBroyles, LLP; John K. Shimmick

(57) ABSTRACT

An accommodating contact lens comprises a variable focus optical module, which comprises an optical chamber and one or more eyelid engaging chambers coupled to the optical chamber with one or more extensions comprising channels extending between the optical chamber and the more eyelid engaging chambers. The module may comprise a self-supporting module capable of supporting itself prior to placement in a contact lens to facilitate placement prior to encapsulation in the contact lens. The module may comprise one or more optically transmissive materials, provides improved optical correction, and can be combined with soft contact lens materials such as hydrogels. In many embodiments, the module comprises a support structure extending between an upper membrane and a lower membrane in order to provide variable optical power accurately with decreased amounts distortion and improved responsiveness to eyelid induced pressure.

14 Claims, 8 Drawing Sheets

Related U.S. Application Data continuation of application No. 16/417,939, filed on May 21, 2019, now Pat. No. 10,754,176, which is a continuation of application No. 15/988,738, filed on May 24, 2018, now Pat. No. 10,338,411, which is a continuation of application No. 14/764,039, filed as application No. PCT/US2014/013427 on Jan. 28, 2014, now Pat. No. 10,018,855.

(60) Provisional application No. 61/757,457, filed on Jan. 28, 2013.

(56) References Cited

U.S. PATENT DOCUMENTS

| | | | |
|---|---|---|---|
| 4,174,156 | A | 11/1979 | Glorieux |
| 4,477,158 | A | 10/1984 | Pollock |
| 4,512,040 | A | 4/1985 | Mcclure |
| 4,525,044 | A | 6/1985 | Bauman |
| 6,092,899 | A | 7/2000 | Wanders |
| 7,322,695 | B2 | 1/2008 | Wooley |
| 7,452,075 | B2 | 11/2008 | Iuliano |
| 7,503,652 | B2 | 3/2009 | Menezes |
| 7,517,084 | B2 | 4/2009 | Wooley |
| 7,694,464 | B2 | 4/2010 | Garcia |
| 7,699,462 | B2 | 4/2010 | Godoy |
| 7,810,925 | B2 | 10/2010 | Evans |
| 9,910,296 | B2 | 3/2018 | Harant |
| 10,018,855 | B2 | 7/2018 | Waite |
| 10,338,411 | B2 | 7/2019 | Waite |
| 10,754,176 | B2 | 8/2020 | Waite |
| 11,874,531 | B2 | 1/2024 | Waite |
| 2002/0021409 | A1 | 2/2002 | Marmo |
| 2008/0231799 | A1 | 9/2008 | Iuliano |
| 2008/0231801 | A1 | 9/2008 | Iuliano |
| 2010/0039709 | A1 | 2/2010 | Lo |
| 2012/0206691 | A1 | 8/2012 | Iwai |
| 2012/0268712 | A1 | 10/2012 | Egan |
| 2015/0370093 | A1 | 12/2015 | Waite |
| 2016/0004098 | A1 | 1/2016 | Waite |
| 2016/0018671 | A1 | 1/2016 | Waite |
| 2016/0377887 | A1 | 12/2016 | Waite |
| 2017/0131570 | A1 | 5/2017 | Thompson |
| 2017/0131571 | A1 | 5/2017 | Waite |
| 2018/0173010 | A1 | 6/2018 | Harant |
| 2019/0048180 | A1 | 2/2019 | Harant |

FOREIGN PATENT DOCUMENTS

| | | |
|---|---|---|
| JP | S5357849 | 5/1978 |
| JP | 08187793 | 7/1996 |
| JP | H08187793 A | 7/1996 |
| JP | 2010522352 A | 7/2010 |
| WO | 9110154 A1 | 7/1991 |
| WO | 2012051167 A1 | 4/2012 |
| WO | 2012061411 A1 | 5/2012 |
| WO | 2014117173 | 7/2014 |
| WO | 2014120928 | 8/2014 |
| WO | 2014161002 | 10/2014 |
| WO | 2015095891 | 6/2015 |
| WO | 2016019346 A1 | 2/2016 |
| WO | 2016019351 | 2/2016 |
| WO | 2016019359 | 2/2016 |
| WO | 2017083770 A1 | 5/2017 |
| WO | 2017083771 A1 | 5/2017 |
| WO | 2017083774 | 5/2017 |
| WO | 2018089699 A1 | 5/2018 |

OTHER PUBLICATIONS

Hsu, et al., Review of ophthalmic drug delivery by contact lenses. J. Drug Del. Sci. Tech. 2014. 24(2) 123-135.

International search report and written opinion dated Aug. 20, 2014 for PCT/US2014/013427.

Kim, et al., Diamond Nanogel-Embedded Contact Lenses Mediate Lysozyme-Dependent Therapeutic Release. ACSNANO. 2014. 8:3; 2998-3005.

Yuan, et al., Ocular Drug Delivery Nanowafer with Enhanced Therapeutic Efficacy. ACSNANO. 2015. 9:2; 1749-1758.

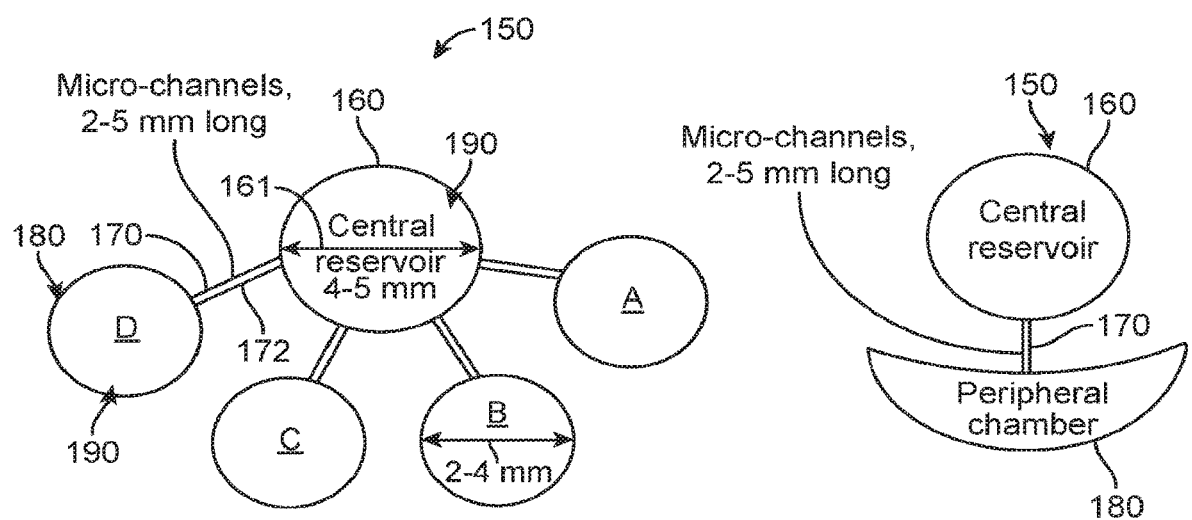
FIG. 2A
FIG. 2B
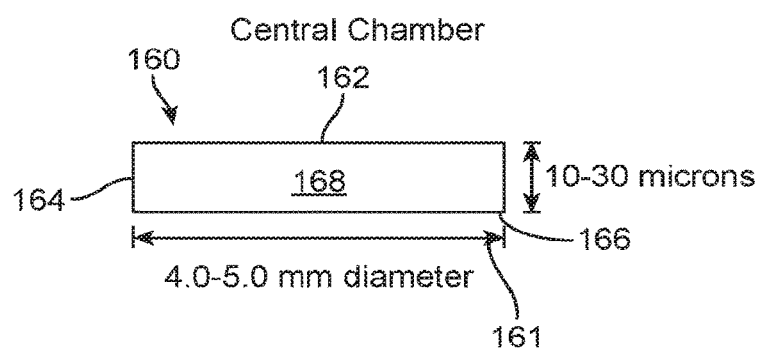
FIG. 2C

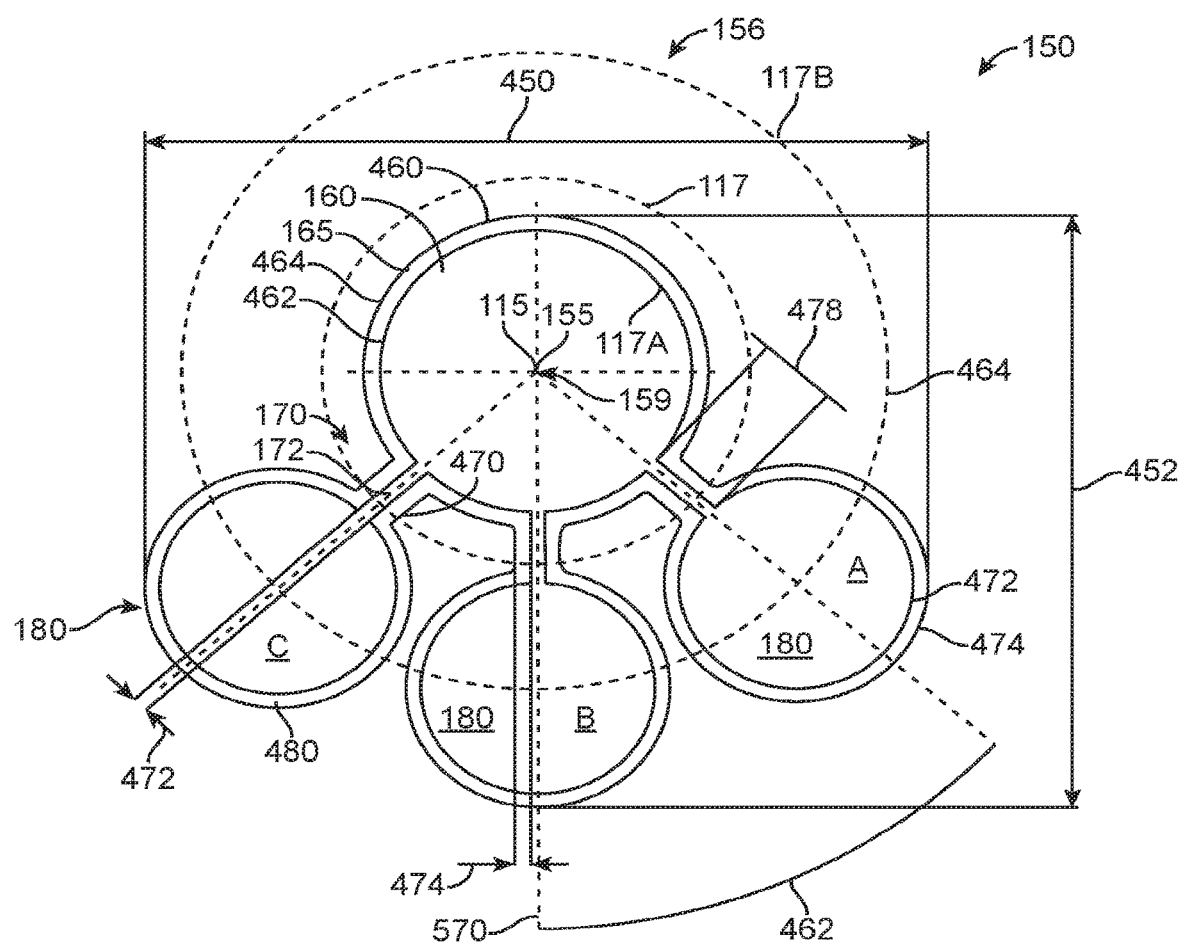
FIG. 4A
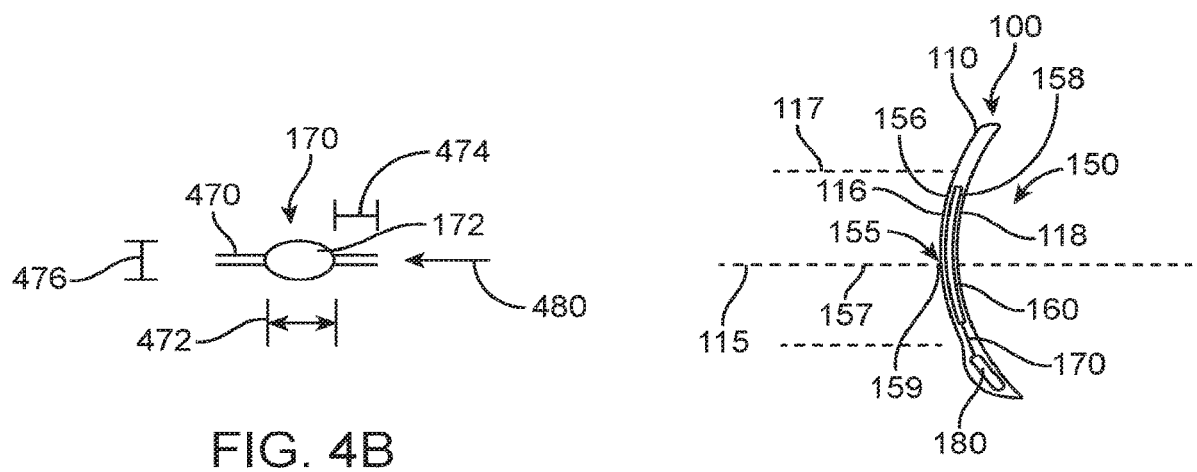
FIG. 4B
FIG. 4C

ACCOMMODATING SOFT CONTACT LENS

RELATED APPLICATIONS

This application is a continuation of U.S. patent application Ser. No. 16/932,228, filed Jul. 17, 2020, now U.S. Pat. No. 11,874,531, issued Jan. 16, 2024, which is a continuation of U.S. patent application Ser. No. 16/417,939, filed May 21, 2019, now U.S. Pat. No. 10,754,176, issued Aug. 25, 2020, which is a continuation of U.S. patent application Ser. No. 15/988,738, filed May 24, 2018, now U.S. Pat. No. 10,338,411, issued Jul. 2, 2019, which is a continuation of U.S. patent application Ser. No. 14/764,039, filed Jul. 28, 2015, now U.S. Pat. No. 10,018,855, issued Jul. 10, 2018, which is a national stage entry of International Application No. PCT/US2014/013427, filed Jan. 28, 2014, published as WO 2014/117173 on Jul. 31, 2014, which claims priority to U.S. Provisional Patent Application No. 61/757,457, filed Jan. 28, 2013, the entire disclosures of which are incorporated herein by reference.

BACKGROUND

The present invention relates generally to the treatment presbyopia.

As the eye ages, the lens of the eye become less capable of moving to provide variable optical power, a condition referred to a presbyopia. In young subjects, the lens of the eye can accommodate viewing at various distances, so that the user can be both near and far object with clear focus. However as the eye ages, the lens of the eye becomes less capable of accommodating both near and far vision and subjects with good far vision may require glasses to read close objects.

Prior methods and apparatus of treating presbyopia provide less than ideal treatment in at least some respects. Prior treatments of presbyopia include bifocal spectacles, progressive addition lenses, and multifocal contact lenses, as well as reading glasses and accommodating intraocular lenses. At least some subjects are spectacle intolerant, and spectacles can be difficult to wear in at least some situations. Multifocal lenses can degrade vision at both near and far vision at least partially in at least some instances. Intraocular lenses require surgery and can be more invasive that would be ideal in at least some instances.

Although multifocal contact lenses have been proposed, such lenses produce less than ideal results in at least some instances. Multifocal contact lenses may have two or more optical zones of different optical power. In at least some instances, one of these zones of different optical power can transmit light to the eye that is out of focus on the retina and degrades vision of the subject. Although contact lenses that translate on the cornea have been proposed in order to provide variable focus, such lenses can be somewhat difficult for subjects to use and provide less than ideal results in at least some instances. Examples of multifocal contact lenses are described in Patent Nos.: U.S. Pat. Nos. 7,517,084; 7,322,695; 7,503,652; 6,092,899; and 7,810,925, for example.

Although accommodating contact lenses have been previously proposed, the prior accommodating contact lenses can be less than ideal in at least some instances. For example, the optical properties of the prior accommodating contact lenses can be less than ideal. For example, the shape of the central shape changing region of the prior accommodating contact lenses can be somewhat distorted when the eye accommodates, and the accommodating optical zone can be somewhat smaller than would be ideal. Also, the optical zones the prior lenses can be shaped somewhat irregularly and may provide less than ideal changes in optical power. Also, the materials of the prior accommodating contact lenses can be less than ideally suited for combination with known contact lens materials, and the extent to which prior accommodating contact lenses can be worn on the eye is less than ideal in at least some instances. Accommodating contact lenses are described in International Publication No. WO 91/10154; U.S. Pat. Nos. 7,699,462; 7,694,464; and 7,452,075, for example.

Work in relation to embodiments also suggests that the prior accommodating contact lenses are less than ideally suited for large manufacturing, and that at least some of the prior accommodating contact lenses may be difficult to produce in large volumes in at least some instances.

Ideally, an improved accommodating contact lens will provide accommodation to the user, be easy to use, provide quality near vision and far vision, be compatible with known safe contact lens materials, and be readily manufactured. At least some of these objectives are met with the embodiments as disclosed herein.

SUMMARY

Embodiments of the present invention provide improved methods and apparatus for a variable focus lens.

In many embodiments, an accommodating contact lens comprises a variable focus optical module, which comprises an optical chamber and one or more eyelid engaging chambers coupled to the optical chamber with one or more extensions comprising channels such as micro-channels extending between the optical chamber and the more eyelid engaging chambers. In many embodiments, the module comprises a self-supporting module capable of supporting itself prior to placement in a contact lens or upon removal from the contact lens, and the extensions may comprise sufficient strength to support and connect the chamber and the one or more chambers in the free standing configuration such as when the module is handled and placed prior to encapsulation in the contact lens. The module may comprise one or more optically transmissive materials, provides improved optical correction, and can be combined with soft contact lens materials such as hydrogels. In many embodiments, the module comprises a support structure extending between an upper membrane and a lower membrane in order to provide variable optical power accurately with decreased amounts distortion and improved responsiveness to eyelid induced pressure. The support structure may comprise a stiff support structure having a stiffness greater than the upper membrane or the lower membrane, or both, in order to inhibit optical distortion of the one or more membranes when deflected in response to fluidic pressure. In many embodiments the support structure extends around the chamber, the one or more chambers and the extensions to add stiffness to the module to facilitate handling of the module when the module is handled prior to encapsulation in the contact lens. The support structure may extend around the chamber, each of the plurality of chambers and each of the plurality of extensions to add stiffness. In many embodiments, the support structure comprises a flange extending around the chamber, the one or more modules, and the one or more extensions.

The module can be encapsulated in the contact lens to provide refractive correction of the eye such as far vision correction within an optical correction zone of the contact lens, which can also improve the near vision correction when the eyelid engages the lens. The structures of the module may comprise an optically transmissive material having an index of refraction similar to an index of refraction of the contact lens material, such that the structures of the module can be encapsulated within the optical correction zone of the lens in order to provide vision correction and improved near vision correction. The structures of the module having the index of refraction of the lens similar to the contact lens material may comprise one or more of the central optical chamber, the support structure of the optical chamber, the one or more eyelid engaging chambers, the one or more extensions extending between the optical chamber and the one or more eyelid engaging chambers, the fluid of the module coupling the optical chamber to the one or more eyelid engaging chambers, or anchor structures comprising openings. The module may comprise anterior and posterior surfaces. The encapsulating contact lens material may comprise an anterior thickness profile extending between the contact lens anterior surface and the module anterior surface, and a posterior thickness profile extending between the contact lens posterior surface and the module posterior surface in order to provide optical correction. The anterior and posterior thickness profiles can extend from each of the one or more module structures in order to provide the optical correction with a portion of the lens comprising the structure such as at least a portion of one or more of the extension, the anchor, the support structure, or the eyelid engaging chamber.

In many embodiments, the module comprises anchors to couple the accommodation module to a soft contact lens material such as a hydrogel, and the anchors may comprise one or more flanges having a plurality of openings to improve coupling to the hydrogel material. The module may comprise a stiffness greater than a stiffness of the soft contact lens material, and the anchors can inhibit separation of the soft contact lens material from the module encapsulated therein when the soft contact lens is deflected or bent.

In many embodiments, the one or more chambers comprise a plurality of chambers arranged to provide an incremental increase in optical power. The plurality of chambers may comprise a first chamber and a second chamber, each coupled to the chamber. The first chamber and the second chamber may be positioned relative to the chamber so as to engage the eyelid with the first chamber before engaging the second chamber upon a downward gaze. Upon additional downward gaze, the second chamber and the first chamber can both be engaged by the eyelid to provide additional curvature to the central chamber corresponding to a near vision correction. The plurality of chambers may comprise additional chambers as appropriate.

In many embodiments the fluid of the module comprises a positive pressure to facilitate fluidic communication between the optical chamber and the one or more eyelid engaging chambers, and in order to increase responsiveness of additional optical power of the optical module in response to the eyelid engaging the one or more chambers and to increase responsiveness of decreased optical power of the optical module in response to the eyelid moving away from the one or more chambers. The support structure may extend along the one or more extensions between the optical chamber and the one or more chambers can facilitate fluidic communication between the chamber and the one or more chambers, and the support structure may extend around each of the chamber, the one or more chambers and the one or more extensions to facilitate fluidic communication among the chambers.

An aspect of the present disclosure provides an accommodation module capable of use with a contact lens. The accommodation module may comprise a chamber and one or more chambers coupled to the chamber with one or more channels.

Another aspect of the present disclosure provides an accommodating contact lens. The accommodating contact lens may comprise an accommodation module encapsulated within a soft contact lens material. The accommodation module may comprise a sealed module. The sealed module may comprise a chamber, an upper membrane, a lower membrane, one or more extensions, and one or more chambers. The chamber may comprise a support structure extending around the chamber. The support structure may comprise an upper portion and a lower portion. The upper membrane and the lower membrane may be coupled to the upper portion and the lower portion, respectively, so as to define the chamber. The one or more extensions may each comprise a channel. The one or more chambers may be coupled to the chamber with the one or more extensions. The one or more chambers may comprise a fluid.

The support structure may hold the upper membrane and the lower membrane with a substantially fixed distance between outer portions of the upper membrane and the lower membrane near the support structure when the contact lens accommodates in order to inhibit optical distortion of one or more of the upper membrane or the lower membrane when fluid is transmitted from the one or more chambers to the chamber.

The sealed module may be located inside the soft contact lens such that a geometrical center of an optic of the soft contact lens is co-linear with a geometrical center of the chamber of the fluidic module.

The channel of each of the one or more extensions may comprise a cross sectional width and a cross sectional height. The cross-sectional width may be greater than the cross sectional height. Each of the one or more extensions may comprise an upper membrane and a lower membrane. The cross-sectional width may comprise a distance within a range from about 10 um to about 1.5 mm. The cross-sectional height may comprise a distance within a range from about 10 um to about 50 um. The extension may comprise a length extending a distance extending between the chamber and the one or more chambers within a range from about 0.5 mm to about 3 mm.

The chamber and the one or more chambers may each comprise a positive pressure. The chamber and the one or more chambers may each comprise a positive pressure providing a deflection of an upper membrane of the chamber and an upper membrane of the one or more chambers in order to facilitate fluidic communication and responsiveness between the chamber and the two or more chambers. An upper membrane of the chamber may comprise a first elastic deflection. An upper membrane of the one or more chambers may comprise a second elastic deflection. A force of the first elastic deflection may oppose a force of the second elastic deflection in order to maintain the pressure of the fluid in the chamber and the one or more chambers.

Top and bottom surfaces of the contact lens may extend over the module. An index of refraction of the fluid may be within a range from about 1.44 to 1.55. The upper membrane and the lower membrane may comprise a similar index of refraction to within about 0.05. The chamber may comprise an internal diameter within a range from about 3 mm to about 5 mm.

The accommodation module may comprise an anchor connected to one or more of the chamber or the one or more chambers. The anchor may be connected to the support structure. The anchor may comprise a flange having a plurality of openings, and a soft material of the contact lens may extend through the plurality of openings. The anchor may comprise a plurality of anchors located around the chamber, and each of the plurality of anchors may comprise a plurality of openings in a flange. The anchor may comprise a plurality of anchors.

The support structure may comprise one or more of a ring, an oval or an annulus extending around the chamber.

The support structure may define a maximum dimension across the chamber. The maximum distance across the chamber may remain substantially fixed when a curvature of one or more of the upper or lower surfaces increases to provide increased optical power.

The support structure may comprise a material similar to the one or more of the upper membrane or the lower membrane.

The support structure may comprise a material of the one or more of the upper membrane or the lower membrane. The support structure may comprise a stiff structure extending around the chamber and may comprise a thickness greater than a thickness of one or more of the upper membrane or the lower membrane to add rigidity to the stiff structure. The support structure may comprise the material of the upper membrane and the material of the lower membrane. And, the material of the upper membrane may be bonded to the material of the lower membrane to define the support structure and add stiffness to the support structure.

The support structure may comprise an annular structure having a substantially fixed inner diameter and a substantially fixed length when the upper membrane increases in curvature to provide at least about 1.5 Diopter of optical power.

The support structure may be connected to the upper membrane. The upper membrane may deflect to a spherical shape in response to pressure of the eyelid. The stiff structure may comprise a substantially fixed maximum dimension across in order to provide the spherical shape when the upper membrane deflects to the spherical shape.

The module may comprise a self supporting module capable of supporting itself when removed from the contact lens.

The support structure may comprise a stiff structure comprising a stiffness greater than a stiffness of the upper membrane.

The support structure may comprise a length extending along an optical axis of the eye corresponding to a thickness of the upper membrane and the lower membrane.

The upper membrane may comprise an upper membrane thickness. The lower membrane may comprise a lower membrane thickness. An upper flange may extend an upper distance from the upper membrane. A lower flange may extend a lower distance from the lower membrane. The lower distance may be greater than the lower thickness. The upper distance may be greater than the upper thickness. The upper flange may be bonded to the lower flange. The upper flange may be bonded to the lower flange to define the support structure.

Each of the one or more chambers may comprise a lower membrane and an upper membrane and an upper flange extending from the upper membrane and a lower flange extending from the lower membrane. The upper flange may be bonded to the lower flange to define a support structure extending around each of the one or more chambers.

Each of the one or more extensions may comprise a lower membrane and an upper membrane and an upper flange extending from the upper membrane and a lower flange extending from the lower membrane. The upper flange may be bonded to the lower flange to define a support structure extending around each of the one or more chambers.

The module may comprise an upper face having an upper thickness and the lower face having a lower thickness greater than the upper thickness. The module may comprise an indicia to indicate an orientation of the upper face and the lower face. The indicia may comprise one or more of a marker or an arrangement of structures to identify the upper face or the lower face. The module may comprise a midline extending through an optical zone of the contact lens. The module may be disposed about the midline. The marker or arrangement of structures on a first side of the midline may identify the upper face in an upper orientation. The marker or arrangement on a second side of the midline may identify the upper face in a lower configuration. The midline may be oriented to within about +/−fifteen degrees of a vertical direction when the user is upright to provide an even weight distribution and inhibit cyclo rotation of the lens relative to the cornea about an optical axis of the eye. The marker or arrangement of structures may comprise an index of refraction similar to an index of refraction of the contact lens material to inhibit visibility of the marker or arrangement of structures when the contact lens material encapsulates the module. The marker or arrangement may be visible when the module is exposed to air. The arrangement of structures may comprise an arrangement of openings in an anchor of the module. The marker may comprise a marking on the module.

The contact lens may comprise an optical correction zone to correct a refractive error of the eye. One or more of an eyelid engaging chamber, an extension, a support structure or an anchor may extend at least partially within the optical correction zone.

The optical correction zone may comprise a lens anterior surface and a lens posterior surface of the contact lens. The module may comprise a module anterior surface and a module posterior surface. The contact lens material may comprise an anterior thickness profile, extending between the lens anterior surface and the module anterior surface, and a posterior thickness profile, extending between the lens posterior surface and the module posterior surface. The module may comprise a module thickness profile extending between the module anterior surface and the module posterior surface. The anterior thickness profile, the posterior thickness profile and the module thickness profile together may provide optical power of the optical correction zone to correct vision of the eye.

At least a portion of the eyelid engaging chamber may extend within the optical correction zone. Light transmitted through the at least the portion may correct vision of the eye.

At least a portion of the extension may extend within the optical correction zone. Light transmitted through the at least the portion may correct vision of the eye.

At least a portion of the support structure may extend within the optical correction zone. Light transmitted through the at least the portion may correct vision of the eye.

At least a portion of the anchor may extend within the optical correction zone. Light transmitted through the at least the portion may correct vision of the eye. The anchor may comprise one or more openings and the contact lens material may extend through the one or more openings. An optically transmissive support material may extend around the one or more openings to define the openings. The optically transmissive support material and the contact lens material may comprise similar indices of refraction to inhibit optical artifacts.

Another aspect of the present disclosure provides an accommodating contact lens. The accommodating contact lens comprises a support structure extending around an optical chamber, one or more chambers coupled to the optical chamber, and a soft material encapsulating the support structure and the one or more chambers. The support structure may comprise an upper portion and a lower portion. The contact lens may further comprise an upper membrane coupled to the upper portion, a lower membrane coupled to the lower portion, and one or more extensions each comprising a channel coupled to the optical chamber and the one or more chambers. The soft contact lens material may encapsulate the one or more extensions. Pressure of an eyelid to the one or more chambers may deflect the upper membrane and an upper surface of the contact lens.

Another aspect of the present disclosure provides an accommodating soft contact lens comprising a hermetically sealed fluid filled module further comprising a circularly symmetric central chamber. The lens may alter its refractive power by at least 0.5 diopters upon down-gaze. In many embodiments, the lens alters its refractive power by at least 1.5 diopters upon down-gaze.

The module may comprise the central chamber and at least one peripheral chamber. The module may comprise one or more micro-channels connecting said central chamber and said peripheral chamber.

The module may be filled with a fluid that cannot permeate through the walls of said module.

The chamber may be cylindrical in shape and may comprise relatively flexible membranes on the top and bottom surfaces. Furthermore, the chamber may comprise a relatively rigid membrane at the edge. The chamber may be of 4.0-5.0 mm in diameter. The edges of the chamber are 10-40 microns in length.

The accommodating contact lens may further comprise membranes comprising the top and bottom surfaces of the central chamber. The membranes may vary in nominal thickness from 5-25 microns. The thickness of the membrane comprising the bottom surface may be greater than the thickness of the membrane comprising the top surface. The membranes may have a refractive index substantially equal to that of the fluid therein and also the contact lens.

One or more micro-channels may be connected to an edge of said central chamber. The central chamber may be completely filled with fluid without the presence of any bubbles or discontinuities.

The module may comprise one or more micro-channels connecting the central chamber and a peripheral chamber. The central chamber may be inflated when fluid is injected into it through the micro-channels. The inflation may cause a decrease in curvature of the membrane comprising the top surface of said central chamber.

The central chamber may be either circular or elongated in shape at the top or the bottom surfaces.

A peripheral chamber may be connected to the central chamber by means of a micro-channel. The total volume of the chambers may be in the range 0.2 to 0.5 microliters. Fluid within the chambers and the micro-channel may have a refractive index substantially equal to that of the contact lens and also that of membranes comprising the top and bottom surfaces of said central chamber. The fluid may comprise a fluorocarbon, a siloxane, an ester, or an ether. The micro-channel may have an internal diameter in the range 20-50 microns. The micro-channel may have micro-indentations on its inner surface, oriented to modulate the flow of fluid therein in preferential directions.

Another aspect of the present disclosure provides an accommodating soft contact lens which may comprise a hermetically sealed fluid filled module. The fluid filled module may further comprise a circularly symmetric central chamber. The module may be embedded in the contact lens, with the anterior surface of the module being within 5 microns and 15 microns of the anterior surface of said lens.

In any of the accommodating contact lens described herein, the one or more chambers may comprise a plurality of chambers arranged to be selectively engaged with an eyelid in order to provide incremental increases in optical power.

The plurality of chambers may comprises a first chamber and a second chamber. The first chamber and the second chamber may be arranged to engage the first chamber with the eyelid before the second chamber in order to provide a first amount of intermediate vision correction when the first chamber is engaged. The first chamber and the second chamber may be arranged to engage the second chamber and the first chamber together with the eyelid to provide a second amount of optical correction corresponding to near vision correction.

The first chamber and the second chamber may be arranged to engage the first chamber with the eyelid margin before the second chamber in order to provide a first amount of intermediate vision correction when the first chamber is engaged with the eyelid margin. The first chamber and the second chamber may be arranged to engage the second chamber and the first chamber together with the eyelid margin to provide a second amount of optical correction corresponding to near vision correction.

The first chamber and the second chamber may be arranged to engage the first chamber with the eyelid margin before the second chamber in order to provide a first amount of intermediate vision correction when the first chamber is engaged with the eyelid margin. The first chamber and the second chamber may be arranged to engage the second chamber and the first chamber together with the eyelid margin to provide a second amount of optical correction corresponding to near vision correction.

Another aspect of the present disclosure provides a method of treating an eye. An accommodating contact lens comprising a chamber and one or more chambers coupled to the chamber is provided. The accommodating contact lens may further comprise an optically transmissive module encapsulated in the contact lens. The module may comprise the chamber and the one or more chambers, and the optically transmissive module may be encapsulated within an optically transmissive contact lens material of the contact lens. A support structure may extend around the chamber to inhibit distortion. A plurality of anchors may couple the optically transmissive chamber and the one or more chambers to an optically transmissive hydrogel material of the contact lens. The one or more chambers may comprise a plurality of chambers arranged to provide incremental increases in optical power with increasing engagement of an eyelid.

BRIEF DESCRIPTION OF THE DRAWINGS

A better understanding of the features and advantages of the present disclosure will be obtained by reference to the following detailed description that sets forth illustrative embodiments, in which the principles of the disclosure are utilized, and the accompanying drawings of which:

FIGS. 2A-2C show examples of fluidic modules and chambers, in accordance with embodiments;

FIG. 4A shows a free standing module comprising an inner optical chamber and a plurality of eyelid engaging outer chambers in accordance with embodiments;

FIG. 4B shows cross-sectional view of an extension and a support flange, in accordance with embodiments;

FIG. 4C shows a soft accommodating contact lens comprising module encapsulated in the soft contact lens material, and optical structures of the contact lens and module, in accordance with embodiments;

DETAILED DESCRIPTION

A better understanding of the features and advantages of the present disclosure will be obtained by reference to the following detailed description that sets forth illustrative embodiments, in which the principles of embodiments of the present disclosure are utilized, and the accompanying drawings.

Although the detailed description contains many specifics, these should not be construed as limiting the scope of the disclosure but merely as illustrating different examples and aspects of the present disclosure. It should be appreciated that the scope of the disclosure includes other embodiments not discussed in detail above. Various other modifications, changes and variations which will be apparent to those skilled in the art may be made in the arrangement, operation and details of the method and apparatus of the present disclosure provided herein without departing from the spirit and scope of the invention as described herein.

The inventors have developed solutions to these problems and disclose herein an improved design of a fluidic module that may be embedded into a soft contact lens for correction of presbyopia.

The embodiments disclosed herein can be combined in one or more of many ways to provide improved accommodation of a contact lens.

As used herein like characters identify like elements.

As used herein the words "top" or "upper" encompass the anterior surface, away from the corneal surface, and the words "bottom" or "lower" encompass the posterior surface, closest to the corneal surface.

As used herein the letter "C" after a number in the context of temperature encompasses degrees Celsius and Centigrade, as will be readily understood by a person of ordinary skill in the art.

As used herein a dash "-" can be used to express a range of values, as will be readily understood by a person of ordinary skill in the art.

As used herein, the same index refraction encompasses an index of refraction close enough to another index of refraction to inhibit visual artifacts that might otherwise be perceptible to the user.

As used herein, similar index refraction encompasses an index of refraction close enough to another index of refraction to inhibit visual artifacts.

Figure 1:
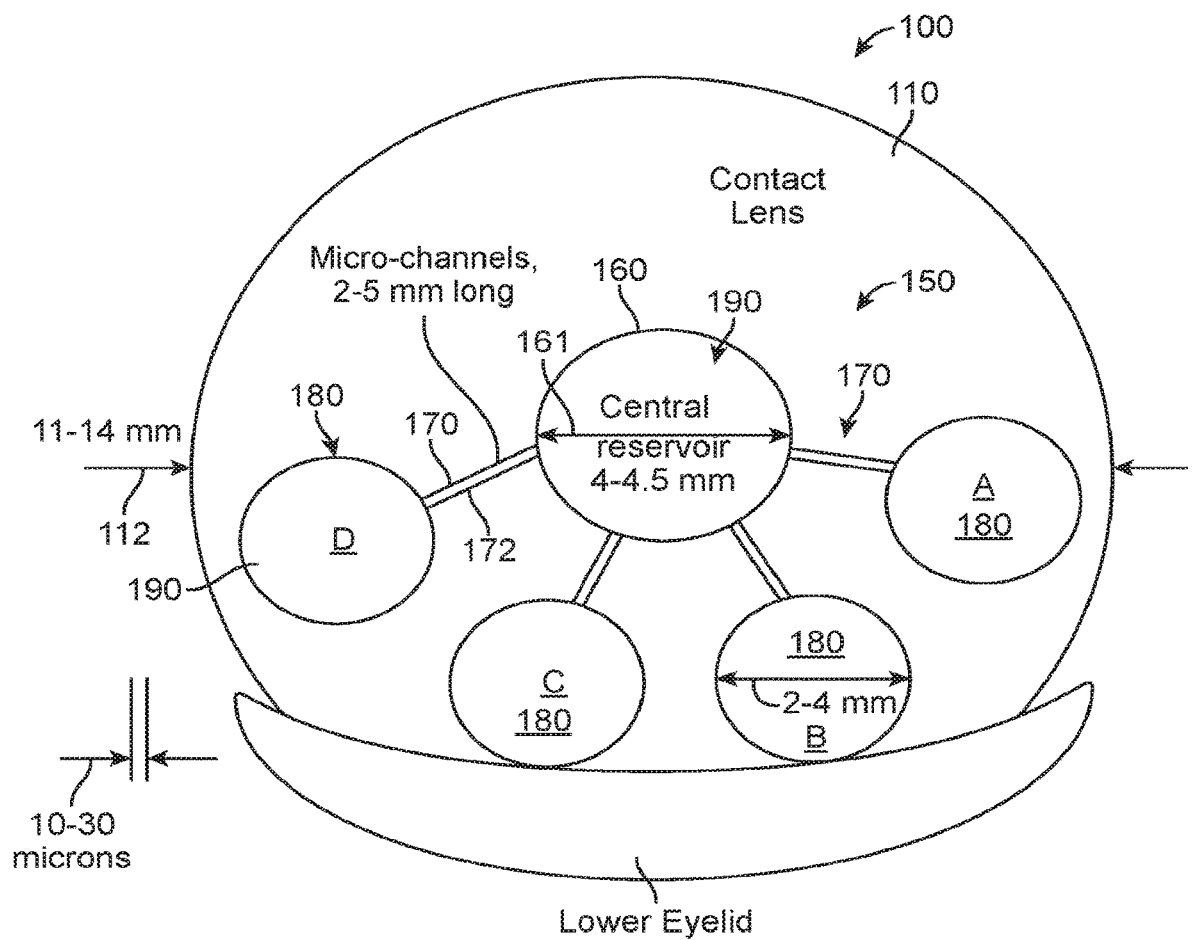
FIG. 1 shows a top view of a fluidic module, comprising a central chamber and several peripheral chambers, interconnected via micro-channels, upon primary gaze, in accordance with embodiments.

FIG. 1 shows a top view of a fluidic module 150, comprising a central chamber 160 and several peripheral chambers 180, interconnected via micro-channels 172, upon primary gaze, in accordance with embodiments.

In many embodiments, the design comprises a single, hermetically sealed fluidic module that comprises one or more separate chambers, interconnected by means of micro-channels, embedded in a soft contact lens, as shown in FIG. 1.

In many embodiments, the central chamber 160 is cylinder shaped with edges that are relatively stiff, its faces being covered by a relatively flexible distensible membrane. The top and bottom faces can be circular in shape.

The central chamber is connected to each of the peripheral chambers by means of a micro-channel.

FIGS. 2A-2C show examples of fluidic modules and chambers, in accordance with embodiments.

The shape of the peripheral chambers are also cylindrical, and their top and bottom faces are circular or elongated, as shown in FIGS. 2A-2C.

The fluidic module can be located inside the soft contact lens 100 such that the geometrical center of the lens optic is co-linear with the geometrical center of the central chamber of the fluidic module.

The fluidic module can be filled with a biocompatible fluid 190, preferably of the same refractive index as the material of the soft contact lens, in the range of 1.44 to 1.55 or about 1.40 to about 1.55, for example.

The viscosity of the fluid can be in the range 0.2-2.0 centistokes at 37 C, or in the range of about 0.2 to 5.0 centistokes at 37 C.

The fluid 190 is preferably a siloxane, a fluorocarbon, an ester, an ether or a hydrocarbon, or combinations thereof, for example.

The membrane is biocompatible, and has an index preferably substantially the same as the fluid and the contact lens itself, in the range 1.44-1.55, or within the range from 1.40 to 1.55, for example.

The membrane may be of the same thickness throughout, or it may have a thickness profile, contoured to control its rigidity or flexibility along the dimensions of the membrane.

The membrane is preferably a fluorocarbon, a polyester, a polyurethane, a polyether, a polyimide, a polyamide, an acrylate or methacrylate ester, or a copolymer bearing these functionalities.

The module may comprise on or more of many optically transmissive materials, such as one or more of a plastic, a polymer, a thermo plastic, a fluoropolymer a non-reactive thermoplastic fluoropolymer, or polyvinylidene difluoride (hereinafter "PVDF"), for example.

The micro-channels are fabricated from a biocompatible material, and may be a fluorocarbon, a polyester, a polyimide, a polyamide, an epoxide, an acrylate or methacrylate ester, or a hydrocarbon such as polypropylene or polyethylene.

The walls of the central chamber of the module may either be composed of the same material as the membrane on the two sides, or it may be made of a different material.

The fluidic module 150 can be embedded in the soft contact lens 100 such that the module is close to the anterior (convex) surface of the lens.

Preferably there is a thin layer of contact lens material above the fluidic module, its thickness being in the range of 5-10 microns.

Being close to the surface of the contact lens, a change in curvature of the fluidic module (caused by inflation or deflation through fluid transfer between the central and peripheral chambers) causes a corresponding change in the anterior curvature of the soft contact lens.

The diameter 161 of the central chamber 160 can be at least about 3 mm, for example within a range from about 3.0 to 5.0 mm, such as a range from about 3.0 to about 4.5 mm, for example within a range from about 4.0-4.5 mm, while the length of the edge can be about 10-40 microns.

The thickness of the membranes 162, 166, comprising the top and the bottom surfaces of the central chamber can be in the range 5-20 microns.

The thickness of the membrane comprising the edge 164 can be in the range 10-50 microns.

The peripheral chambers 180 have a total area of 5.0-8.0 $mm^2$ and a thickness of 10-30 microns each.

The total volume of the sealed module can be in the range of 0.15-0.80 $mm^3$, or 0.15-0.80 microliter, or from about 0.15 to about 2.50 $mm^3$ (about 0.15 to about 2.50 microliter), for example.

Each micro-channel can be about 10-30 microns in internal diameter and about 2-5 mm long, or from about 1 to about 5 mm long, for example.

The micro-channels may be designed to have a uniform internal diameter or it may have micro-indentations oriented to impede flow in one direction in preference to the other.

The purpose of these indentations can be to modulate the response time of the onset and removal of the additional plus power after the down-gaze.

Figure 3:
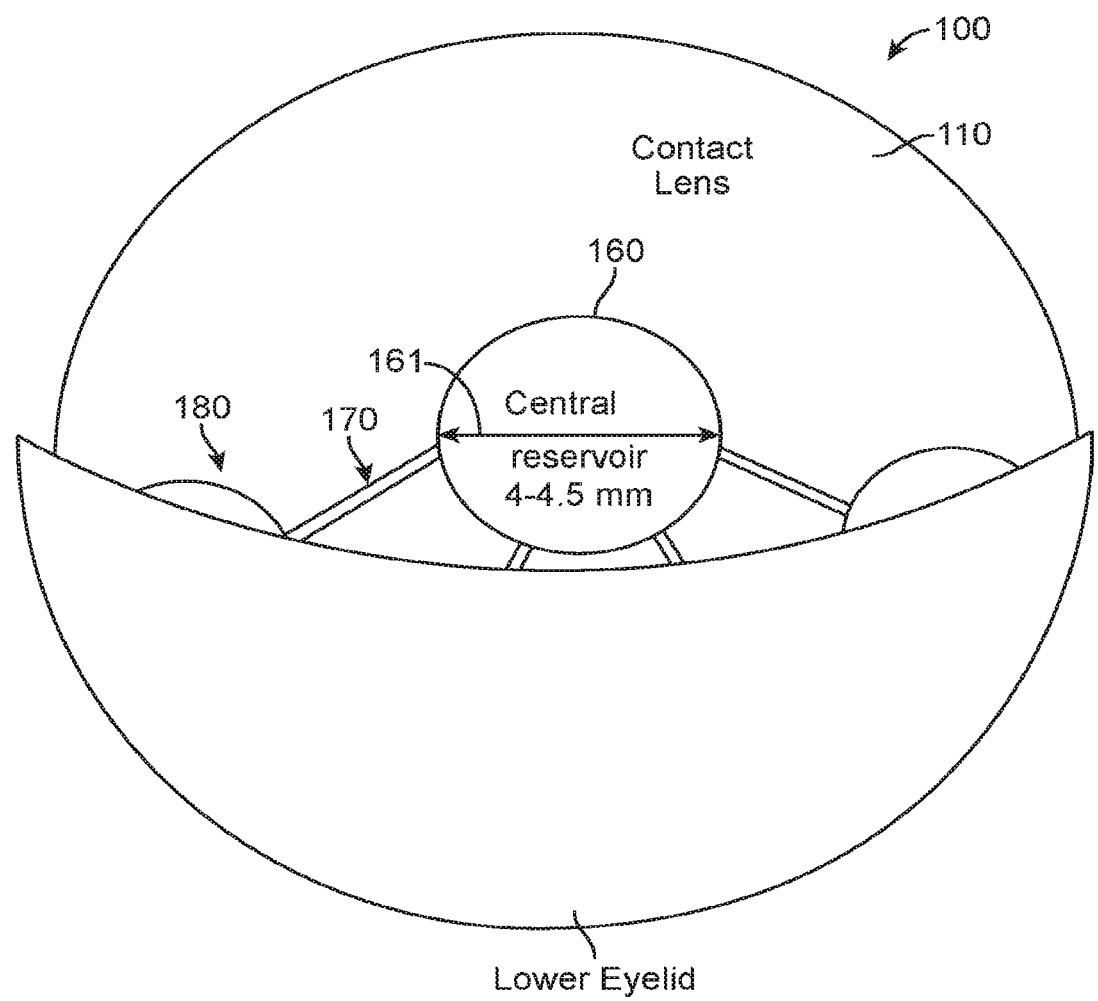
FIG. 3 shows a top view of the fluidic module, comprising a central chamber and several peripheral chambers, interconnected via micro-channels, upon downward gaze, in accordance with embodiments.

FIG. 3 shows a top view of the fluidic module, comprising a central chamber and several peripheral chambers, interconnected via micro-channels, upon downward gaze, in accordance with embodiments.

The mechanism of action involves movement of the scleral sphere caused by down-gaze typically occurring when the wearer attempts to read or perform a near vision task.

The eyeball moves down by about 20 degrees-60 degrees, depending on the level of down-gaze, causing the corneal surface to rotate down by about 2.0 mm-6.0 mm The peripheral chambers slide under the lower eyelid and can be compressed, as shown in FIG. 3.

A 2.0 mm downward movement of the lens positioned on the cornea will cause partial (30-60%) compression, while a 4.0 mm or greater eye movement will cause the entire peripheral chamber to be compressed.

In many embodiments eyelid caused compression will be able to expel a fraction (20%-60%) of the fluid in the peripheral chamber(s) when the totality of peripheral chambers move under the lower eyelid.

The fluid moves travels through the micro-channels connected at the distal end to the central chamber, and increases the hydrostatic pressure in the central chamber.

The hydrostatic pressure being equal in all directions, causes a spherical inflation of the membrane on the top and bottom faces.

This inflation may be preferentially directed to the top surface by using a thicker membrane at the top surface, rendering it stiffer than the membrane covering the bottom surface of the central chamber In some embodiments, the hydrostatic pressure may be equal in all directions, and consequently causes a spherical inflation of the membrane on the top and bottom faces.

In many embodiments, the relative extent of inflation of the top and the bottom faces can be adjusted by adjusting the thickness of the membranes covering the top and bottom faces and providing an accommodating module having an appropriate thickness of each of the top and bottom membranes.

Similarly, the edge can be rendered less distensible by using a relatively thick walled membrane for its fabrication.

In many embodiments, a 2.0 D increase in power can be achieved by a 5.0-7.0 micron sag height change of the anterior (top) surface of the central chamber, when the central chamber is within a range from about 3.0 mm to about 5.0 mm, for example about 4.0 mm in diameter. Alternatively or in combination, a 2.0 D increase in power can be achieved by a 5.0-15.0 micron sag height change of the anterior (top) surface of the central chamber, when the central chamber is within a range from about 3.0 mm to about 5.0 mm, for example about 4.0 mm in diameter.

This change in curvature can be effected by injection of fluid of volume equal to 0.10-0.15 microliters. Alternatively or in combination, the change in curvature can be effected by injection of fluid of volume within a range from about 0.07 to about 0.21 microliters, for example.

In many embodiments, the total volume of fluid to be expelled from the peripheral chambers to the central chamber due to eyelid pressure can be within a range from about 0.10 to about 0.30 microliters. Alternatively or in combination, the total volume of fluid to be expelled from the peripheral chambers to the central chamber due to eyelid pressure can be within a range from about 0.07 to about 0.30 microliters.

As shown in FIGS. 1-3, the central optical chamber 160 comprising the reservoir is connected to the one or more eyelid engaging chambers with one or more extensions 170 comprising one or more channels 172. The one or more eyelid engaging chambers 180 may comprise a plurality of eyelid engaging chambers, such as chamber A, chamber B, chamber C and chamber D. A plurality of extensions comprising a plurality of channels connects the plurality of chambers to the central optical chamber. The micro-channels extend between the central optical chamber and each of the plurality of chambers.

The plurality of eyelid engaging chambers can be arranged in one or more of many ways. For example, the eyelid engaging chambers can be arranged to engage the eyelid sequentially, simultaneously, incrementally, or in combinations thereof, for example.

The plurality of eyelid engaging chambers can be arranged to provide incremental amounts of optical power to the central optical chamber upon increasing engagement of the lower eyelid with the plurality of chambers. In many embodiments, a first eyelid engaging chamber such as chamber B or chamber C engages the eyelid before a second eyelid engaging chamber such as chamber A or chamber D. Engagement of the first eyelid engaging chamber can urge a first amount of fluid into the central optical chamber to provide a first amount of optical power. Engagement of the second eyelid engaging chamber can urge a second amount of fluid into the central optical chamber to provide a second amount of optical power greater than the first amount of optical power. The first amount of fluid from the first eyelid engaging chamber can be combined with the second amount of fluid from the second eyelid engaging chamber to provide the second amount of optical power greater than the first amount of optical power, for example. In many embodiments, the first amount of fluid can be combined with the second amount of fluid within the central optical chamber to provide the increased optical power.

In many embodiments, the first chamber comprises a first plurality of chambers, and the second chamber comprises a second plurality of chambers, for example. Chambers B and C may comprise a first plurality of chambers, each contributing an amount of optical power within a range from about 0.25 Diopters to about 0.75 Diopters, for example. Chambers A and D may comprise a second plurality of chambers, each contributing an amount of optical power within a range from about 0.25 Diopters to about 0.75 Diopters, for example. For example each of chambers A, B, C and D may provide about 0.5 Diopters of correction, and engagement of chambers B and C provides about 1 D of additional optical power with a first position of the lens in relation to the eyelid, and engagement of chambers A, B, C and D provides about 2 D of additional optical power with a second position of the eyelid in relation to the lens.

FIG. 4A shows a free standing module 150 comprising an inner optical chamber 160 and a plurality of eyelid engaging outer chambers 180. A support structure 165 such as a flange 460 extends around the optical chamber 160 and may extend around each of the eyelid engaging chambers 180 and the extensions 170. The flange 460 may comprise one or more flanges to provide support such as an extension flange 470. Each of the flanges extends from a first inner location 472 to a second outer location 474, so as to define a width of the flange. For example, the flanges 460 of the optical chamber can extend from a first inner location 462 to a second outer location 464, so as to define a width of the flange.

The contact lens 100 and module 150 each comprises optical components that can be arrange in one or more of many ways. In many embodiments, the module 150 comprises an optical center 155 located along an optical axis 157 of the optical chamber 160. The optical center 155 comprises an optical center of the optical chamber 160. The optical center 155 may comprise a location along optical axis 157 extending through a center of the support structure 165 and vertex of the upper membrane 162 when the optical chamber 160 comprises increased curvature to provide additional optical power, for example.

The module 150 comprises a maximum lateral dimension across 450, and a maximum vertical dimension across 452, as may be defined when the user stands, for example.

FIG. 4B shows cross-sectional view of an extension and a support flange.

The channel 172 can be shaped in one or more in many ways and comprises a cross sectional width 472. The channel 170 comprises a height 476. In many embodiments, the height 476 is less than the width 472.

The optical correction zone 117 of the contact lens 100 can be configured in one or more of many ways as disclosed herein, so as to provide beneficial vision to the subject. The optical correction zone 117 comprises a zone of the contact lens 100 that provides desired optical correction of the subject, such as far vision correction, for example. In many embodiments, the optical correction zone 117 is sized in relation to the pupil of the subject, which can vary with age and lighting, and a person of ordinary skill in the art can determine an appropriate size of the optical correction zone 117 based on the teachings provided herein. The optical correction zone 117 can be sized within a range from smaller than the inner diameter 161 of chamber 160 to larger than a dimension covering the module 150. In many embodiments, the optical correction zone 117 comprises a dimension, such as a diameter, sized within a range from about the diameter of the optical correction zone 160 to a diameter covering the one or more eye engaging chambers 180. In many embodiments, the eye optical correction zone 117 comprises a diameter sized so that the outer boundary extends through the one or more extensions 170 when the center of the optical correction zone is aligned within the optical module, for example when axis 115 is aligned with the center 155 of the module. In many embodiments, the eye optical correction zone 117 comprises a diameter sized so that the outer boundary extends through the one or more eye engaging members 180 when the center of the optical correction zone 117 is aligned within the optical module 180, for example when axis 115 is aligned with the center 155 of the module.

In many embodiments, the optical correction zone 117 is sized such that the optical correction zone extends over one or more anchors as described herein.

The structure of the module 150 can be symmetrically disposed about a midline 570, so as to inhibit gravitationally induced rotation of the module, for example when the subject stands. In many embodiments, the midline 570 is arranged for placement on the contact lens such that the midline 570 is aligned to the known 90 degree axis of the cornea of the eye, for example.

While each of the flanges can be shaped in one or more of many ways, in many embodiments the flange 470 comprises a width 474 extending from an interior of the channel 172. The flanges of each of the optical chamber 160 and one or more chambers 180 can be similarly formed.

In many embodiments, each of flanges comprises an upper flange of an upper membrane and a lower flange of a lower membrane. The flange of the upper membrane can be boned to the flange of the lower membrane to define the optical chamber 160, the one or more extensions 170 and the one or more outer chambers 180, for example. The lower membrane can be thicker than the upper membrane to encourage greater movement of the upper membrane than the lower membrane The bonding of the upper flange to the lower flange can be performed in one or more of many ways, such that the lower flange and upper flange are joined, for example joined securely, to each other, in many embodiments by means of an adhesive substance, heat, or pressure and may comprise one or more of welding, adhesive, or pressure, for example.

In many embodiments the module may comprise a first sheet of material bonded to a second sheet of material in order to define the support structure 165 comprising the flange, for example.

FIG. 4C shows soft accommodating contact lens 100 comprising module 150 encapsulated in the soft contact lens material 110, and optical structures of the contact lens and module, in accordance with embodiments. In many embodiments, the module 150 is embedded in the soft contact lens material. The contact lens may comprise an optical correction zone 117 to provide far vision correction to the subject, and may correct one or more of spherical refractive error, astigmatism, myopia or hyperopia of the subject, for example. In many embodiments, the center of the optical correction zone 117 comprises a center located along an optical axis 115 of the accommodating contact lens 110. The optical correction zone 117 may comprise an anterior surface 116 of the contact lens 100 and a posterior surface 118 of the contact lens, in which the anterior and posterior surfaces comprise profiles configured to provide a far vision correction of the subject when the one or more eyelid engaging chambers 180 do not engage the eyelid of the subject. For example, the posterior surface of the contact lens 118 can be provided so as to fit the cornea of the subject, and the anterior surface 116 can be configured to provide the intended far vision of the subject when combined with the posterior surface.

In many embodiments, the module 150 comprises an accommodation correcting optical zone defined with an inner dimension such of the support structure 165, such as an inner diameter 161 of the optical chamber 160, in order to provide near vision correction within the optical zone 117 of the contact lens 100. The optical center 155 of the module 150 is located along an optical axis of 157 of the optical chamber 160. In many embodiments, the optical axis 115 of the contact lens is coaxial with the optical axis 155 of the module, and the optical center of the contact lens may be collinear with the optical center of the optical chamber. Alternatively, the optical center 155 of the module 150 can be displaced from the optical center of the contact lens. For example, the optical center 155 of the module can be displaced inferiorly, or nasally, or both, in relation to the optical center of the contact lens, for example.

The material 110 of the contact lens 100 can be arranged over the module 150 in one or more of many ways to provide accommodating vision for the subject such as a consumer. In many embodiments, the soft contact lens material 110 encapsulates the module 150 so as to inhibit perceptible visual artifacts of the contact lens 100. In many embodiments, the contact lens material and materials of the module comprise similar indices of refraction so as to inhibit visual artifacts that might otherwise be perceptible to the user. For example, the anterior membrane 162 of the central optical chamber 160 may comprise a curvature greater than the curvature of the anterior surface of the optical correction zone 117 of the lens, and the indices of refraction of the membrane 162 and the soft contact lens material 110 can be substantially similar, such that light passing through the interface of the contact lens material 110 and membrane 162 is not substantially refracted by the interface.

In many embodiments, the thickness profiles of the contact lens module, the anterior contact lens material, and the posterior contact lens material can be combined so as to provide the optical correction zone 116 of the lens 100. In many embodiments, the soft contact lens material 110 encapsulating module 150 comprises a varying thickness profile between the module 150 and one or more of the anterior ("upper") surface 116 and posterior ("lower) surface 118 in order to provide the intended refraction. In many embodiments, the module 150 comprises an anterior face such as an anterior surface 156 and a posterior face such as posterior surface 158. In many embodiments, the module 150 comprises a varying thickness profile extending between anterior surface 156 and posterior surface 158. A thickness profile of the contact lens material 110 extending between the anterior surface 116 of the lens 110 and the anterior surface 156 of the module 150 varies so as to provide optical correction of the subject with the anterior surface 116. A thickness profile of the contact lens material 110 extending between the posterior surface 118 of the lens 110 and the posterior surface 158 of the module 150 varies so as to provide optical correction of the subject with the posterior surface 118.

The soft contact lens material 110 may cover the module 110 with a configuration that provides optical irregularities outside of the optical zone 117 in order to inhibit visual artifacts. For example, the contact lens 100 may comprise a configuration that produces a slight bulge over the eyelid engaging chamber 180, and the eyelid engaging chamber can be located outside of the optical zone 117 of the contact lens 100 such that light passing through the eyelid engaging chamber is substantially occluded by the iris of the eye.

Figure 4D:
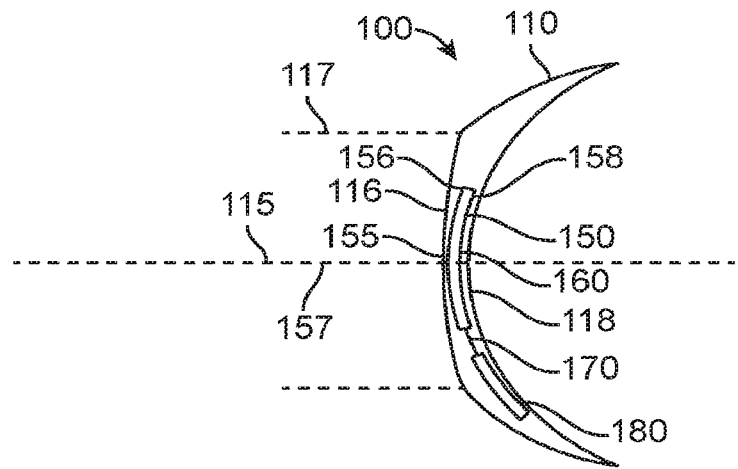
FIG. 4D shows an accommodating contact lens comprising a far vision correction configuration, in which the optical correction zone extends over the optical chamber and the one or more extensions, and at least partially over the one or more eye engaging chambers, in accordance with embodiments.

FIG. 4D shows a contact lens 100 comprising a far vision correction configuration, in which the optical correction zone 117 extends over the optical chamber 160 and the one or more extensions 170, and at least partially over the one or more eye engaging chambers 180. The contact lens material 110 comprises: an anterior varying thickness profile extending between the anterior surface 116 and the anterior surface 156, a posterior varying thickness profile extending between the posterior surface 118 and the posterior surface 158, in response to an intermediate varying thickness profile extending between the anterior surface 156 and the posterior surface 158, in order to provide optical correction with optical correction zone 117. Light rays refracted by the anterior surface that extend through the one or more eye engaging chambers 156 provide an optical correction of the subject, which may comprise a far vision correction, for example.

The varying thickness profiles and substantially similar indices of refraction allow complex module structures to be encapsulated within the contact lens material 110 in a manner that inhibits visual artifacts.

The contact lens 100 may comprise an anterior surface 116 flatter than posterior surface 118 as shown in FIG. 4D, in order to provide distance vision correction to a near sighted subject. A person of ordinary skill in the art will recognize that the curvatures as shown in FIG. 4D are not shown according to scale in order to illustrate structure of the optical correction zone and outer peripheral zone. The outer peripheral zone of the anterior surface may comprise a steeper curvature than the surface 116 of the optical correction zone.

Figure 4E:
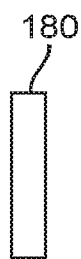
FIG. 4E shows the one or more eye engaging chambers in an uncompressed configuration, in accordance with embodiments.

FIG. 4E shows the one or more eye engaging chambers 180 in an uncompressed configuration, in accordance with embodiments. The upper and lower membranes in the uncompressed configuration may comprise one or more of a convex curvature, a concave curvature, and combinations thereof. In many embodiments, the anterior membrane of the chamber 180 comprises a thickness greater than the posterior membrane of the chamber 180, and the anterior membrane of the chamber 180 comprises a thickness greater than an anterior membrane of the optical chamber 160, in order to inhibit aberrations of the one or more peripheral chambers.

Figure 4F:
FIG. 4F shows the one or more eye engaging chambers in a compressed configuration, in accordance with embodiments.

FIG. 4F shows the one or more eye engaging chambers 180 in a compressed configuration, in accordance with embodiments. The upper and lower membranes in the compressed configuration may comprise one or more of a convex curvature, a concave curvature, and combinations thereof, such that the volume of the compressed chamber comprises an amount less than the volume of the uncompressed chamber.

Figure 5:
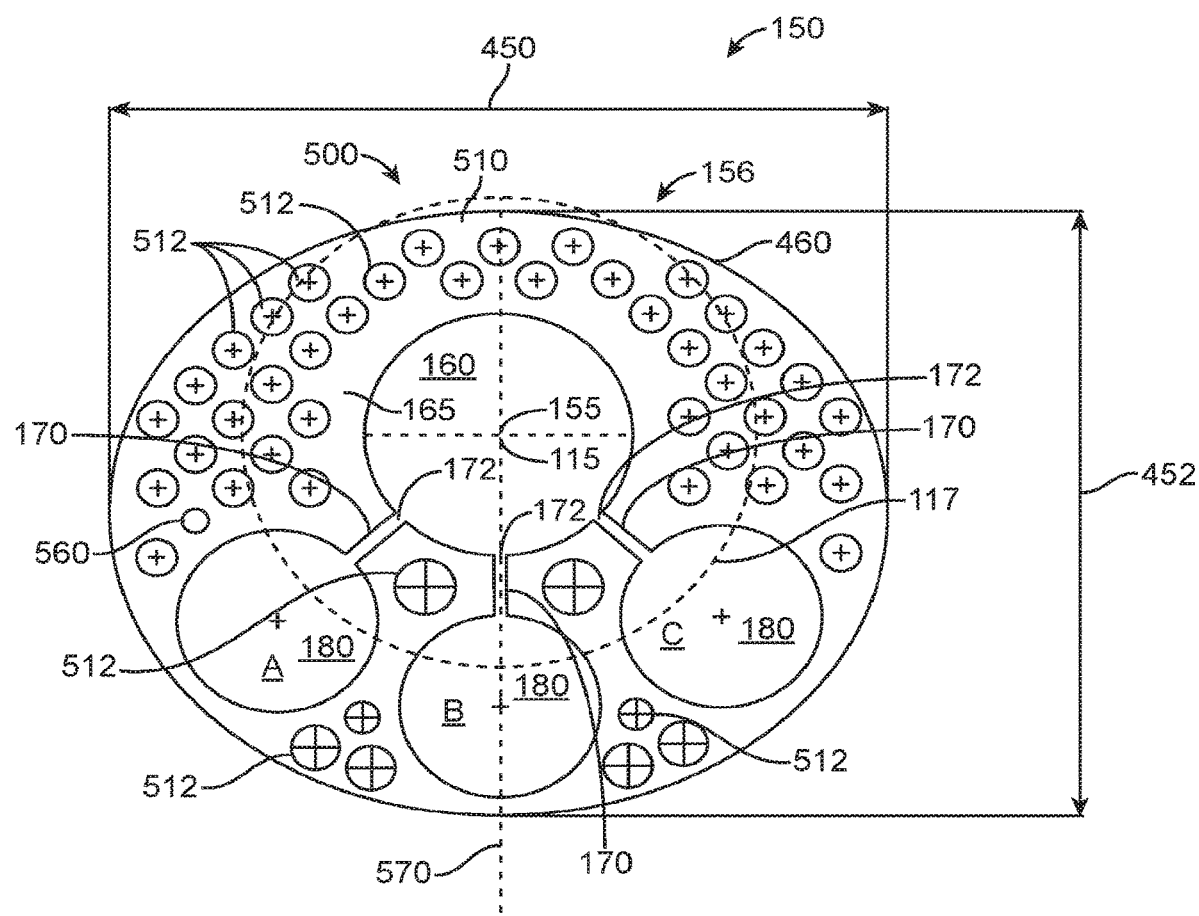
FIG. 5 shows a free standing module comprising an inner optical chamber and a plurality of outer eyelid engaging chambers, in which the module has an anchor comprising a flange with a plurality of openings to hold the module in the contact lens.

FIG. 5 shows a free standing module 150 comprising an inner optical chamber 160 and a plurality of outer eyelid engaging chambers 180, in which the module has an anchor 500 comprising a flange 510 with a plurality of openings 512 to hold the module in the contact lens. The module can be dimensioned so as to comprise an oval outer perimeter, for example, as defined with dimension 450 and dimension 452, for example.

An indicia of alignment such as a marker 560 can be provided with the module 150 in order to properly orient the module with respect to the contact lens during manufacturing. For example, the module 150 may comprise a thicker lower membrane and a relatively thinner upper membrane as described herein, and the marker 560 can be placed on one side of the midline, such as the left side when viewed toward the upper surface of the module to indicate that the upper thinner face of the module is properly oriented. Alternatively or in combination, the anchor may comprise a structure to indicate the alignment of the module 150.

Figure 6:
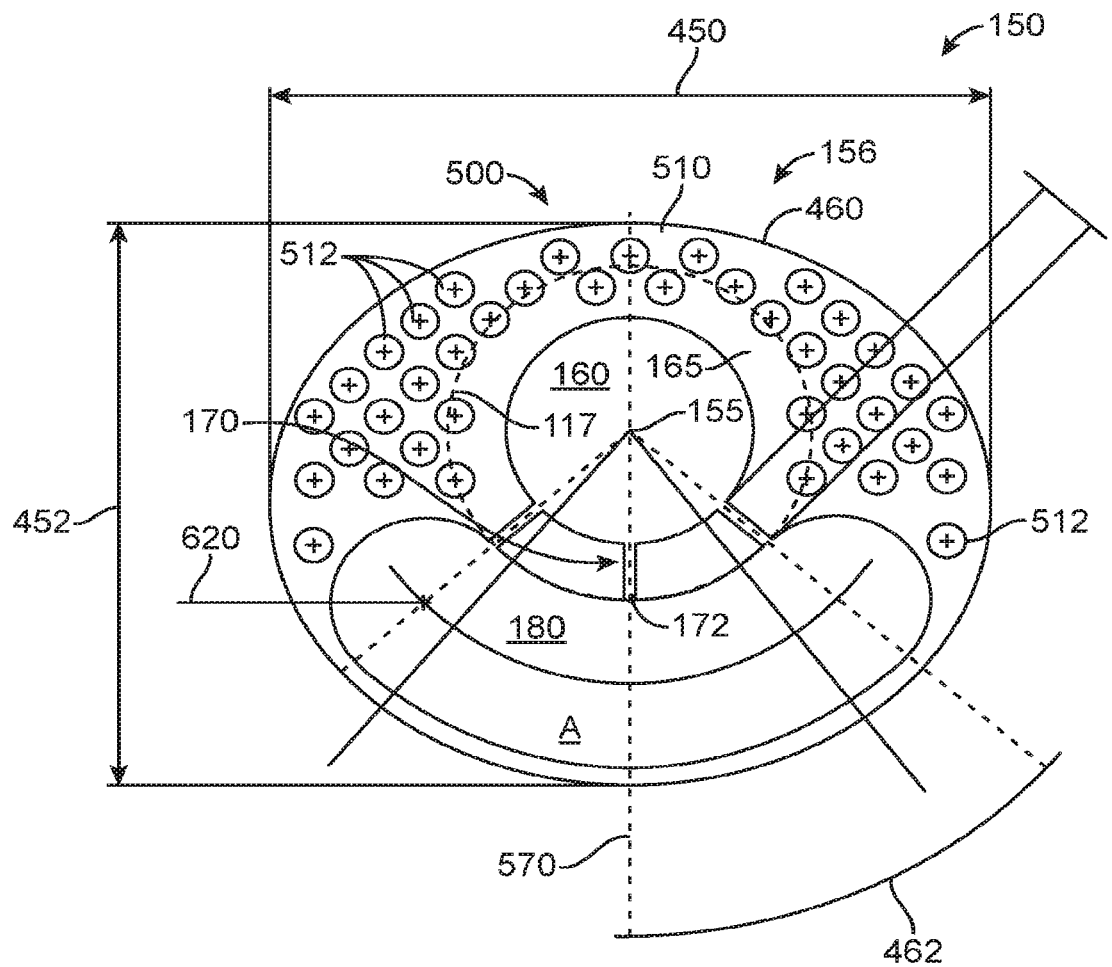
FIG. 6 shows a free standing module comprising an inner optical chamber and an outer arcuate eyelid engaging chamber, in which the module has an anchor comprising a flange with a plurality of openings to hold the module in the contact lens.

FIG. 6 shows a free standing module 150 comprising an inner optical chamber 160 and an outer arcuate eyelid engaging chamber 180, in which the module has an anchor 500 comprising a flange 510 with a plurality of openings 512 to hold the module in the contact lens. The arcuate eyelid engaging chamber comprises an angular dimension 462, and a radius 620 defining and end portion.

Although an anchor comprising a plurality of openings is shown, the anchor may comprise one or more of many structures providing an increase surface area, for example, such as a brush or screen, for example.

Figure 7:
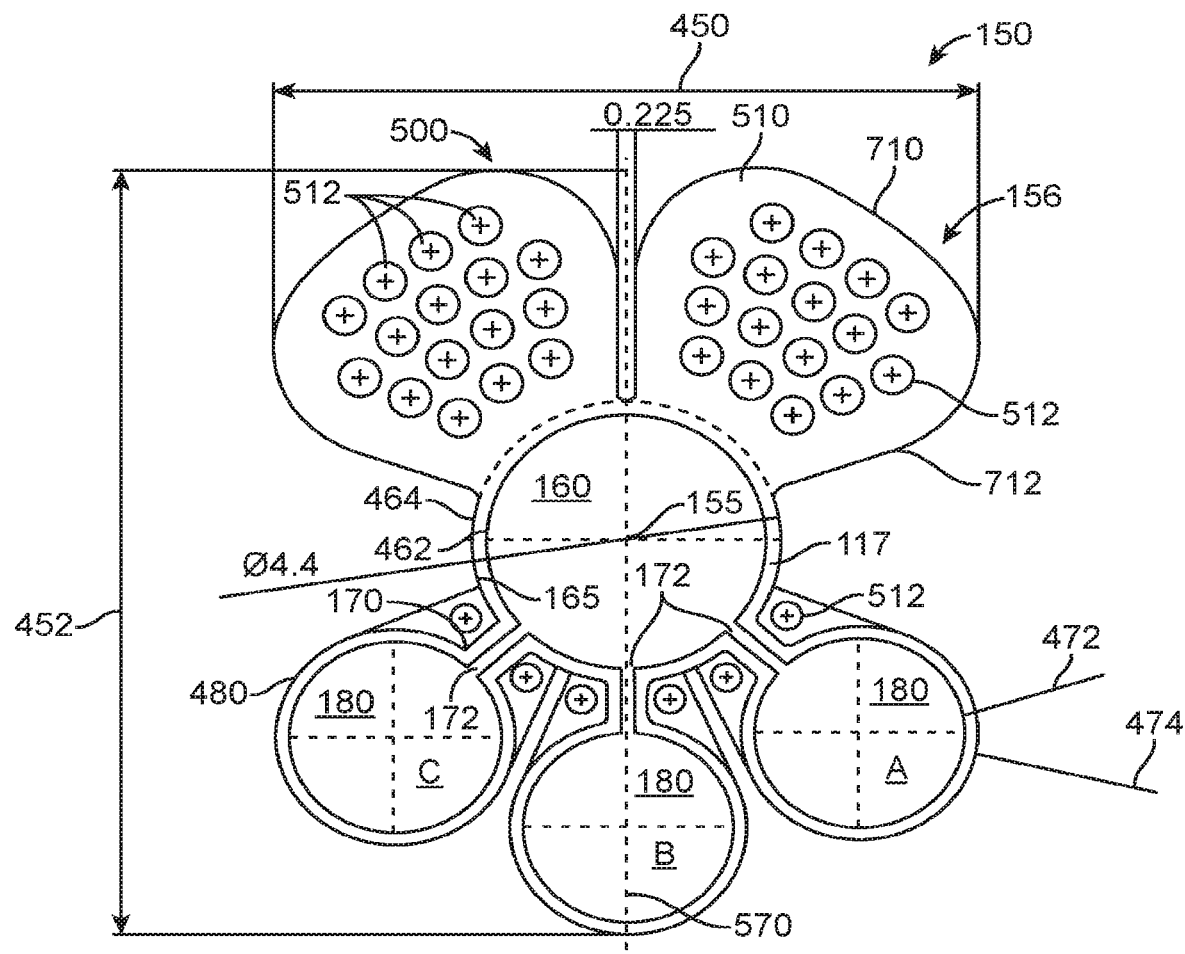
FIG. 7 shows a free standing module comprising an inner optical chamber and a plurality of outer eyelid engaging chambers, in which the module has an anchor comprising a flange with a plurality of openings to hold the module in the contact lens.

FIG. 7 shows a free standing module 150 comprising an inner optical chamber 160 and a plurality of outer eyelid engaging chambers 180, in which the module 150 has an anchor 500 comprising a plurality of flanges 510 with a plurality of openings 512 to hold the module in the contact lens 150. The anchoring flanges can be shaped in one or more of many ways and may comprise a plurality of lobes, for example. Each of the lobes may comprise a first radius 710 and a second shorter radius 712, for example.

The soft material of the soft accommodating contact lens in which the module is encapsulated, for example embedded, may comprise one or more of many known soft commercially available materials such as one or more of a hydrogel, silicone, siloxane, silicone hydrogel, galyfilcon A, senofilcon A, Comfilcon A, Enfilcon A, polyacrlate.

Figure 8:
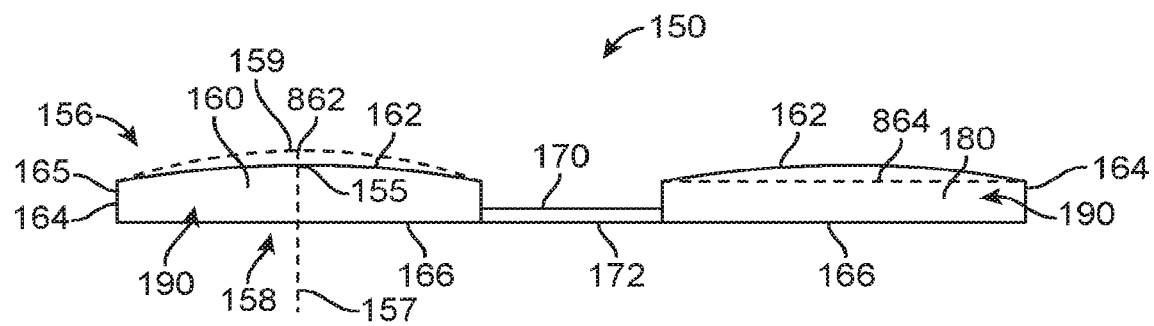
FIG. 8 shows a pressurized accommodating module, in accordance with embodiments.

FIG. 8 shows a free standing pressurized accommodating module 150, suitable for combination in accordance with embodiments described herein. The module 150 can be pressurized with fluid 190 in order to decrease hysteresis and improve responsiveness of the module. In the free standing unloaded configuration, the upper membrane 162 of the optical chamber 160 and the upper membrane 162 of eye engaging chamber 180 may each comprise a slightly convex outward curvature in response to the pressurization. When the eyelid engages the membrane 162 of the one or more chambers 180, the membrane is urged downward toward the lower membrane 166 so as to drive fluid 190 into optical chamber 160. In response to the addition fluid 190 in chamber 160, the upper membrane 162 comprises an increased curvature 862 so as to provide additional optical power for one or more of intermediate or near vision as disclosed herein. The membrane 162 may comprise a vertex 159 in the curved configuration as described herein. As the module 150 may comprise one or more support structures as disclosed herein, the pressurization can result in opposing forces directed to each upper membrane such that each membrane comprises an elastic deformation in the free standing unloaded configuration so as to provide improved responsiveness of the module. The elastic membrane deflections and corresponding opposing forces may comprise an equilibrium configuration of the opposing elastic forces of the membranes, for example.

The module and anchors as described herein are well suited for combination of the lens module with a hydrogel contact lens material, for example. In many embodiments, the module comprises a stiffness greater than the contact lens material, and the anchors allow the module to be retained within the contact lens when the contact lens is deflected, for example bent, without the module rupturing the contact lens material. In many embodiments, the module comprises a first non-hydrogel material such as a plastic, and the contact lens material comprises a hydrogel, and the anchors facilitate retention of the module in the contact lens material when the hydrogel material expands or contracts and the module comprises substantially fixed dimensions.

While preferred embodiments of the present disclosure have been shown and described herein, it will be obvious to those skilled in the art that such embodiments are provided by way of example only. Numerous variations, changes, and substitutions will be apparent to those skilled in the art without departing from the scope of the present disclosure. It should be understood that various alternatives to the embodiments of the present disclosure described herein may be employed without departing from the scope of the present invention. Therefore, the scope of the present invention shall be defined solely by the scope of the appended claims and the equivalents thereof.

What is claimed is:

1. An accommodating contact lens comprising:
   an optical chamber;
   an eyelid-engaging chamber coupled to the optical chamber; and
   one or more channels extending between the optical chamber and the eyelid-engaging chamber;
   wherein a soft contact lens material is arranged to be selectively engaged with an eyelid in order to provide incremental increases in optical power;
   wherein top and bottom surfaces of the accommodating contact lens extend over the optical chamber and the eyelid-engaging chamber;
   wherein a liquid within the optical chamber and the eyelid-engaging chamber provides a deflection of an upper membrane of the optical chamber and an upper membrane of the eyelid-engaging chamber in order to facilitate fluidic communication and responsiveness between the optical chamber and the eyelid-engaging chamber.

2. The accommodating contact lens as in claim 1, further comprising a flange extending around the optical chamber and the eyelid-engaging chamber, the flange comprising a first material and one or more anchors, the one or more anchors connected to the optical chamber and the eyelid-engaging chamber to couple an optical zone and the eyelid-engaging chamber to a second material comprising hydrogel.

3. The accommodating contact lens as in claim 2, wherein the optical chamber comprises a support structure extending around the optical chamber and the anchor is connected to the support structure.

4. The accommodating contact lens as in claim 2, wherein the one or more anchors comprises a plurality of openings formed in the flange and wherein the second material comprising hydrogel extends through the plurality of openings.

5. The accommodating contact lens as in claim 2, wherein the one or more anchors comprises a plurality of anchors located around the optical chamber and the plurality of anchors comprises a plurality of openings in the flange.

6. The accommodating contact lens as in claim 2, wherein the one or more anchors comprises a plurality of anchors.

7. The accommodating contact lens as in claim 2, wherein the flange defines an outer perimeter extending around the optical chamber and the eyelid-engaging chamber.

8. The accommodating contact lens as in claim 1, wherein an accommodation module is encapsulated within the soft contact lens material.

9. The accommodating contact lens as in claim 8, wherein the accommodation module comprises a sealed module, the sealed module comprising, the optical chamber, wherein the optical chamber comprises a support structure extending around the optical chamber, the support structure comprising an upper portion and a lower portion, an upper membrane and a lower membrane coupled to the upper portion and the lower portion, respectively, so as to define the optical chamber, and wherein a plurality of eyelid-engaging chambers comprises a fluid.

10. The accommodating contact lens as in claim 1, wherein a geometrical center of an optic of the soft contact lens material is co-linear with a geometrical center of the optical chamber.

11. The accommodating contact lens as in claim 1, wherein an index of refraction of a fluid in the optical chamber is within a range from about 1.44 to 1.55 and the top and bottom surfaces of the accommodating contact lens comprise a similar index of refraction to within about 0.05.

12. The accommodating contact lens as in claim 1, wherein the optical chamber comprises an internal diameter within a range from about 3 mm to about 5 mm.

13. The accommodating contact lens as in claim 1, wherein the optical chamber comprises a support structure extending around the optical chamber, the support structure comprising an upper portion and a lower portion and the support structure comprises one or more of a ring, an oval or an annulus extending around the optical chamber.

14. The accommodating contact lens as in claim 1, wherein the optical chamber comprises a support structure extending around the optical chamber, the support structure comprising an upper portion and a lower portion and the support structure defines a maximum dimension across the optical chamber and wherein the maximum distance across the optical chamber remains substantially fixed when a curvature of one or more of the upper or lower surfaces increases to provide increased optical power.

* * * * *